United States Patent [19]

Cassatta et al.

[11] Patent Number: 4,477,327
[45] Date of Patent: Oct. 16, 1984

[54] DISCOLORATION RESISTANT, FLEXIBLE, RADIATION CURABLE COATING COMPOSITIONS

[75] Inventors: Joseph C. Cassatta, Taylor; David L. Garrett, Jr., Southfield; Henk van Oene, Detroit, all of Mich.

[73] Assignee: Ford Motor Company, Dearborn, Mich.

[21] Appl. No.: 369,943

[22] Filed: Apr. 19, 1982

[51] Int. Cl.³ .............................................. C08G 18/00
[52] U.S. Cl. ......................... 204/159.15; 204/159.19; 427/44; 427/54.1
[58] Field of Search ............................... 427/44, 54.1; 204/159.19, 159.15

[56] References Cited

U.S. PATENT DOCUMENTS

| | | | |
|---|---|---|---|
| 3,509,234 | 4/1970 | Burlant et al. | |
| 3,924,023 | 12/1975 | Boranian et al. | 427/54.1 |
| 3,950,592 | 4/1976 | Hahn et al. | 427/44 |
| 3,959,521 | 5/1976 | Suetsugi et al. | 427/44 |
| 4,129,667 | 12/1978 | Lorenz et al. | 427/44 |
| 4,301,209 | 11/1981 | Lorenz et al. | 427/44 |

*Primary Examiner*—John H. Newsome
*Attorney, Agent, or Firm*—Lorraine S. Melotik; Roger L. May

[57] ABSTRACT

A low dosage radiation polymerizable protective and decorative coating composition or paint, coated articles bearing such a protective coating and processess for preparing such articles. The radiation polymerizable coating composition comprises an organic resin/monomer mixture of:

(A) between about 97 and about 3 weight percent alpha-beta olefinically unsaturated organic resin containing between about 0.5 and about 5 vinyl unsaturation units per 1000 molecular weight of said resin, and (B) between about 3 and about 97 weight percent vinyl monomers polymerizable with said resin upon exposure to radiation, characterized in that said vinyl monomers include N-vinyl-2-pyrrolidone in an amount of from about 3 and up to about 10 weight percent based on the total weight of (A) and (B).

The flexible coating exhibits excellent physical qualities and good adhesion to a variety of substrates being particularly suitable for use on vinyl chloride fabric, wherein it is discoloration resistant after heat aging. Preferred articles bearing such a coating, which may comprise large amounts of pigment, are preferably cured by exposure to electron beam radiation.

19 Claims, No Drawings

DISCOLORATION RESISTANT, FLEXIBLE, RADIATION CURABLE COATING COMPOSITIONS

TECHNICAL FIELD

Reference is made to commonly assigned and concurrently filed U.S. application Ser. No. 369,946 entitled "Stabilization of Electron Beam Curable Compositions for Improved Exterior Durability to Garrett, Jr. et al now U.S. Pat. No. 4,393,094.

This application relates to radiation polymerizable flexible coating compositions. More particularly, this application relates to low dosage radiation curable, preferably 100% solids coating compositions which yield adhesive, flexible, heat resistant, abrasion resistant coatings, particularly suitable as decorative and protective coatings for polyvinyl substrates, especially polyvinyl chloride fabric, whereon they maintain their discoloration resistance even at elevated temperatures. Most particularly, this invention relates to coating compositions comprising an alpha-beta olefinically unsaturated organic resin and vinyl monomers (a particular embodiment of which comprises a urethane modified vinyl oligomer and vinyl acrylate monomers), characterized in that the vinyl monomer N-vinyl-2-pyrrolidone is included in a limited amount.

BACKGROUND ART

Coating compositions which are curable under the influence of radiation in general, and ultra-violet light and electron beam in particular, are well known. Unfortunately, these coating compositions suffer from a number of disadvantages. For example, many of these coatings have insufficient flexibility that causes them to crack in use when applied to flexible substrates. Other compositions do not adhere sufficiently to the substrate or to laminated layers of the coating with the undesirable result that they become dislodged or peel. Still other coating compositions require the use of solvents that must be evaporated during the curing process. The evaporation of such solvents increases production time, consumes energy and creates atmospheric pollution problems. Other compositions produce coatings that yellow, and have insufficient scratch resistance, stain resistance, abrasion and/or solvent resistance.

Still other compositions cannot be applied to polyvinyl chloride (PVC) substrates which are subjected to high use temperatures, since the dehydrohalogenation of the PVC, which takes place at elevated temperatures, deleteriously affects the coating. Additionally, some compositions do not cure adequately with low dosage radiation so as to allow sufficiently rapid processing for advantageous commercial feasibility.

Burlant et al in U.S. Pat. No. 3,509,234 teach radiation curable coating compositions comprising a urethane modified vinyl prepolymer and copolymerizable vinyl monomers suitable for coating wood or metal. Burlant et al, however, do not disclose the use of N-vinyl-2-pyrrolidone in their composition.

Lorenz et al in U.S. Pat. No. 4,129,667 teach a radiation curable coating composition comprising a urethane vinyl oligomer and an acrylic ultraviolet light absorber, and optionally, copolymerizable vinyl monomers. Lorenz et al, while disclosing the use of N-vinyl-2-pyrrolidone as suitable for use as the optional vinyl monomer therein, teach that this monomer may be incorporated in large amounts, whereas the subject invention teaches the critical use of a limited amount of this monomer which can be included in the composition.

DISCLOSURE OF INVENTION

The coating compositions of the subject invention comprise low dosage radiation polymerizable, heat resistant, flexible, discoloration resistant coating compositions. This coating composition comprises an organic resin/monomer mixture of: (A) between about 97 and about 3 weight percent alpha-beta olefinically unsaturated organic resin containing between about 0.5 and about 5, preferably between about 0.5 and about 3, vinyl unsaturation units per 1000 units molecular weight of the resin, and (B) between about 3 and about 97 weight percent vinyl monomers polymerizable with the resin upon exposure to radiation, characterized in that the vinyl monomer comprises N-vinyl-2-pyrrolidone which is included in the composition in an amount of between about 3 and about 20, preferably between about 3 and about 10, weight percent based on the total weight of (A) and (B).

This invention is also directed to an embodiment of this composition which is particularly suitable for use on flexible substrates, wherein the coating composition, exclusive of pigments, initiators and other nonreactive components consists essentially of an organic resin/monomer mixture of:

(A) between about 90 and about 10 weight percent oligomer of formula I:

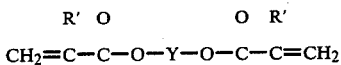

wherein:

R' is hydrogen or methyl, preferably hydrogen; and

Y is a divalent urethane residue; and the oligomer has between about 0.5 and about 5, preferably between about 0.5 and about 3, vinyl unsaturation units per 1000 units molecular weight of the oligomer; and (B) between about 10 and about 90 weight percent vinyl monomers polymerizable with the oligomer upon exposure to radiation, characterized in that the vinyl monomers consist essentially of (i) acrylic monomers and (ii) N-vinyl-2-pyrrolidone, wherein the N-vinyl-2-pyrrolidone is included in the composition in an amount of between 3 and about 20, preferably between about 3 and about 10, weight percent based on the total weight of (A) and (B).

In this particular embodiment, the acrylic ester monomers comprise at least 70 percent by weight monovinyl acrylic esters, more preferably greater than 80 percent by weight monovinyl acrylic esters. Preferably, this embodiment of the composition is 100% solids, i.e., contains no volatile solvent.

In addition to being low dosage radiation curable and preferably 100% solids, the coating compositions of this invention provide excellent protective and decorative surfaces which adhere well to a variety of substrates including, in particular, polyvinyl chloride, while maintaining their excellent physical properties including discoloration resistance thereon even at elevated (102° C.) temperatures for 80–200 hours.

This invention is also directed to a process for applying the coating compositions defined above.

BEST MODE FOR CARRYING OUT THE INVENTION

It has now been found that coating compositions having particularly advantageous properties can be obtained by including N-vinyl-2-pyrrolidone in a limited amount in compositions comprising alpha-beta olefinically unsaturated resins and vinyl monomers.

Inclusion of N-vinyl-2-pyrrolidone in the composition imparts flexibility and improved wear resistance to the coating. Additionally, its high reactivity contributes to rapid curing, and it possess low oxygen sensitivity, a desirable radaiation cure condition. However, it has been found that in order to retain the discoloration resistance of such a coating which has been applied to polyvinyl chloride fabric and heat aged, the level of N-vinyl-2-pyrrolidone must be limited as detailed above. During exposure of polyvinyl chloride to electron beam or during heat aging, it appears that substantial quantities of HCl can be liberated from the vinyl which then can react with terminal N-vinyl-2-pyrrolidone and discolor the coating. By including N-vinyl-2-pyrrolidone in the subject composition in only the limited quanties taught, the composition remains discoloration resistant. These findings regarding the acid-vinyl pyrrolidone reaction suggest that the subject composition would also find particular use in other acid environments wherein such a discoloration resistant coating would be desirable. While this theory regarding discoloration has been advanced, neither its validity nor understanding is necessary for the practice of this invention.

The constituents of the coating composition of this invention, optional components, methods for curing and application techniques will hereinafter be discussed in greater detail.

RADIATION POLYMERIZABLE COATING COMPOSITION

In this application, the term "paint" is meant to include finely divided pigment and/or particulate fillers as well as other additives in a film forming, resin comprising, binder or the binder without pigment, particulate filler, and other additives. Thus, the binder which is ultimately converted to a wear resistant film can be all or virtually all that is used to form the film or it can be a vehicle for pigment and other additives.

As noted above in the Disclosure of the Invention, the radiation polymerizable coating compositions of this invention comprise an organic resin/monomer mixture of (A) between about 97 and about 3 weight percent of an alpha-beta olefinically unsaturated resin, and (B) between about 3 and 97 weight percent vinyl monomers polymerizable with the resin upon exposure to radiation, characterized in that the vinyl monomer includes N-vinyl-2-pyrrolidone in an amount of between about 3 and about 20, preferably between 3 and 10 weight percent, based on the total weight of (A) and (B).

In a particular embodiment of this coating composition, especially suitable for coating flexible substrates, the resin consists of a urethane modified resin and the vinyl monomers consist of acrylic monomers and N-vinyl-2-pyrrolidone.

ALPHA-BETA OLEFINICALLY UNSATURATED RESIN

The term "alpha-beta olefinically unsaturated organic resin" as used herein means an organic resin having olefinic unsaturation provided by an alpha-beta olefinically unsaturated monomer. The term "alpha-beta unsaturation" as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic or methacrylic acid or styrene. The organic resin/monomer mixture of the coating compositions of this invention preferably includes between about 97 and about 7 weight percent of such an alpha-beta olefinically unsaturated resin containing between about 0.5 and about 5 units, preferably between about 0.5 and about 3 units, of unsaturation per 1000 units of molecular weight. The selection of the particular alpha-beta olefinically unsaturated organic resin will, of course, depend upon the particular selection of the compound polymerizable therewith as well as the type of substrate being coated, the intended use of the end product and the desired viscosity of the binder, keeping in mind the desired mode of application.

Representative of radiation polymerizable coating compositions which comprise an alpha-beta olefinically unsaturated resin and a compound polymerizable therewith, such resins being suitable for use in the subject invention, are those disclosed in the following U.S. Pat. Nos.: 3,437,514; 3,437,512; 3,437,513; 3,528,844; 3,542,586; 3,542,587; 3,577,262; 3,577,263; 3,577,264; 3,577,265; 3,585,065; 3,586,528; 3,586,530; 3,623,399; 3,641,210; 3,642,939; 3,649,337; 3,650,811; 3,650,812; 3,650,813; 3,660,143; 3,660,144; 3,660,145 and 3,660,471. Although the compositions disclosed in each of these patents will be discussed further hereinafter, the complete disclosure of each of the patents is incorporated herein by reference. The following discussion of alpha-beta olefinically unsaturated resins is presented as a summary of the various types of resins which may be employed in radiation curable paints known in the prior art and taught in the above incorporated prior art patents. Of course, the particular details regarding the various prior art radiation curable compositions are more adequately described in the patent disclosures incorporated herein by reference.

U.S. Pat. No. 3,437,514 to Burlant discloses a number of preferred types of alpha-beta olefinically unsaturated resins useful in this invention, which types are generic to a number of resins disclosed by others of the patents listed above. One of these resins is of the vinyl resin type. The term "vinyl resin" as used in this context is one which is formed from "vinyl monomers" and which includes the requisite amount of alpha-beta olefinic unsaturation. The term "vinyl monomers" is intended to mean monomeric compounds having a

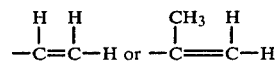

terminal group and excludes allylic compounds, resins and modified acrylic resins, the former meaning a resin formed exclusively of acrylic monomers and the latter meaning a resin formed from a major amount of acrylic monomers and a minor amount of non-acrylic monomers. The term "acrylic monomers" means an alpha-beta monounsaturated monocarboxylic acid or esters thereof and includes, but not by way of limitation, acrylic acid, alkylacrylic acids, e.g., methacrylic acids, monohydric and polyhydric alcohol esters of acrylic acid and alkylacrylic acids, e.g., glycidyl methacrylate, 2-hydroxyethyl methacrylate, etc. These resins have a molecular weight in excess of about 1000, commonly about 5000 to about 25,000. Similar alpha-beta olefinically unsaturated vinyl monomers containing polymers are disclosed in U.S. Pat. Nos. 3,528,844; 3,542,586; 3,542,587; 3,577,265; 3,586,529; 3,586,528; 3,586,530; 3,641,210 and 3,642,939. All of these vinyl monomer containing polymers may be prepared by conventional free radical initiated copolymerization using two or more, preferably three or more, vinyl monomers at least one of which has a free or pendant functional group within its molecular structure, e.g., hydroxyethyl methacrylate. This functionality allows the polymer intermediate to then be reacted with various other monomers such as glycidyl methacrylate to provide the desired alpha-beta olefinic unsaturation.

A second type of alpha-beta olefinically unsaturated organic resin disclosed by U.S. Pat. No. 3,577,262 is a polyester having a molecular weight greater than 1,000 and preferably between about 2,000 and about 20,000. The preferred polyester is a copolymerization product of a polyhydric alcohol, and an acyclic, alpha-unsaturated alpha-beta olefinically unsaturated polyester. U.S. Pat. Nos. 3,649,337 and 3,660,371 disclose related unsaturated polyester resins formed by reacting an alpha-beta olefinically unsaturated, monocarboxy terminated, polyester with an epoxy functional graded-rubber particle.

A third type of unsaturated organic resin useful in this invention and taught by the Burlant patent is a silicone modified organic resin comprising a polyester having incorporated therein a cyclic or acyclic siloxane which prior to reaction of incorporation has a reactive hydroxyl or hydrocarboxy group bonded to at least two of its silicon atoms. Such a resin can also be prepared by reacting vinyl monomers, at least one of which is a hydroxylated monomer. Various modifications of resins of this type are taught in U.S. Pat. Nos. 3,437,512; 3,437,513; 3,650,811; 3,650,812; 3,650,813; 3,577,264 and 3,632,399.

A fourth alpha-beta olefinically unsaturated organic resin disclosed by Burlant et al in U.S. Pat. No. 3,509,234 and by Lorenz et al in U.S. Pat. No. 4,129,667 and useful in this invention is a urethane-modified organic polymer formed by reacting a diisocyanate monomer and an organic resin having in its molecular structure a plurality of hydrogen atoms which are labile with respect to an isocyanate group. This resin, which comprises a particular embodiment will be hereinafter discussed in greater detail.

A final category of alpha-beta olefinically unsaturated organic resins disclosed by Burlant comprises epoxy resins having the requisite amounts of unsaturation. Similar epoxy containing resins are also disclosed in U.S. Pat. Nos. 3,577,263 and 3,660,145.

Still other alpha-beta olefinically unsaturated resins are taught by several of the patents enumerated above. For example, both U.S. Pat. Nos. 3,660,144 and 3,660,145 teach alpha-beta olefinically unsaturated elastomeric particles of cross linked acrylic polymer for use in radiation curable paints and U.S. Pat. No. 3,585,065 teaches an alpha-beta olefinically unsaturated siloxane resin for use in a film-forming binder system. Of course, the subject invention is not limited to the types of unsaturated resin summarized above, but may include any alpha-beta olefinically unsaturated organic resin having the requisite unsaturation and being polymerizable upon being subjected to ionizing radiation. It should also be appreciated that the radiation polymerizable paints of this invention may also employ mixtures of the various alpha-beta olefinically unsaturated organic resins where desired for the particular application.

URETHANE MODIFIED VINYL OLIGOMERS OF FORMULA I

The oligomers of Formula I of the subject invention comprise radiation curable prepolymers which have both urethane and acrylic functionality. The oligomers of Formula I with an acrylic or methacrylic component are well known in the art. Oligomers of this type are shown in U.S. Pat. Nos. 3,907,574; 3,874,906; 3,989,609; and 3,895,171. These urethane-modified resins are prepared from a suitable organic resin, a diisocyanate monomer and a suitable vinyl monomer.

Suitable starting organic resins have in their molecular structure a plurality of hydrogen atoms which are labile with respect to an isocyanate group, e.g., a labile hydrogen of an amine, amide, alcohol or carboxylic acid. The following discussion, while referring to hydroxylated resins, would similarly be applicable to the other starting resins would be known to one in the art. The hydroxylated starting resins may be tailored in their preparation so as to assist in providing the desired end properties for the paint and in such preparation the number of hydroxyl groups per 1000 units molecular weight may be varied. As a minimum the starting resin will contain sufficient hydroxyl groups to permit sufficient reaction with diisocyanate monomers and their subsequent reaction with hydroxylated vinyl monomers to provide the resin used in the binder with the requisite vinyl unsaturation, i.e., about 0.5 to about 5 groups per 1000 units molecular weight. Although not restricted to such elements, the starting resin will ordinarily consists of carbon, hydrogen and oxygen.

Urethane-acrylic oligomers suitable for use in the subject invention are taught and their preparation described in U.S. Pat. No. 3,509,234 to Burlant et al and U.S. Pat. No. 4,129,667 to Lorenz et al. The teachings of these patents with respect to these oligomers is hereby expressly incorporated by reference into the subject application. A brief discussion of such oligomer preparation is presented hereinafter, but is not to be construed as exemplary of all suitable oligomers which may be used in the subject invention.

In a first embodiment the starting resin is an alkyd type polyester which may or may not have olefinic carbon-to-carbon unsaturation. Broadly, this group encompasses the alkyd resins which are the polymeric reaction products of a polyhydric alcohol and a dicarboxylic acid or anhydride, e.g., maleic, fumaric, itaconic, etc., in the case of the unsaturated alkyds and succinic, adapic, etc., in the case of the carbon-to-carbon saturated alkyds.

The preferred polyester resins are prepared from a cyclic dibasic acid or anhydride, for example maleic anhydride, succinic acid, etc., and aliphatic, cyclic, dibasic acid anhydride, for example, tetrahydrophthalic anhydride, 1,4-cyclohexane dicarboxylic acid, etc., and a branched chain polyhydric alcohol, for example, neopentyl glycol. In one embodiment all or a portion of the branched chain polylhydric alcohol is replaced with straight chain polyhydric alcohol, for example, 1,4- butane diol. A cyclic aromatic dibasic acid anhydride, for example phthalic anhydride, may be used but aliphatic cyclic acids are preferred. In another embodiment, the starting resins are prepared by the polymerization of acrylic monomers, at least one of which provides hydrogen after such polymerization. Insofar as acrylate and methacrylate monomers are used in this polymerization, the acrylic resins also have a plurality of ester linkages. Ordinarily, the monomers will include one which contains a free or dissociable hydroxyl group.

Starting resins can also include polytetrahydrofuran, polycaprolactone polyols and other polyols which can be reacted with a diisocyante produced an isocyanate terminated prepolymer.

The isocyanate terminated prepolymer is then capped with a capping agent to produce the oligomer. In general, any capping agent having a terminal amine or hydroxyl group and also having an acrylic ester or methacrylic acid moiety is suitable, with the acrylic moiety being preferred. Example of suitable capping agents include among other hydroxyethyl acrylate, hydroxyethyl methacrylate, hydroxypropyl acrylate, aminoethyl acrylate, etc.

As will be well known to one in the art, the oligomers are generally prepared from the starting resin in solution with a suitable solvent. The solvent preferably is one or more of the vinyl monomers which will be used later in the monomeric component of the paint binder. To the first product resin, still in the solution of the vinyl monomer solvent, is added a vinyl monomer (capping agent) having a hydrogen atom labile with respect to an isocyanate group to produce the oligomer.

The urethane modified prepolymer suitable for use in the paint binders of the subject invention are oligomers preferably having a molecular weight between about 400 and about 10,000, most preferably between about 1000 and 5000. Commercial materials are available which comprise suitable organic resins for the subject composition and include, for example, Hughson Resin 2910-13, RD-3422-30 (available from the Lord Company, Erie, Penn.), Uvithane 788 (available from Thiokol Chemical Company, Trenton, N.J.) and Uvimer 775 (available from Polychrome Corporation, Yonkers, N.Y.).

It should also be appreciated that the radiation polymerizable paint of this invention may also employ mixtures of various suitable urethane modified resins.

VINYL MONOMER POLYMERIZABLE WITH OLIGOMER

Another component of the coating composition of this invention, polymerizable with the oligomer by exposure to ionizing radiation, is a vinyl monomer or a mixture of vinyl monomers including N-vinyl-2-pyrrolidone, wherein the N-vinyl-2-pyrrolidone is included in the composition in an amount of between about 3 to 20, preferably between about 3 and about 10, weight percent based on the total weight of the alpha-beta olefinically unsaturated resin and vinyl monomer.

According to the broadest embodiment of the composition of the subject invention, N-vinyl-2-pyrrolidone may be the only vinyl monomer used therein limited however to an amount of between about 3 and about 20 weight percent based on the total weight of resin and monomers. However, it is preferable to employ other vinyl monomers in combination with the N-vinyl-2-pyrrolidone as the vinyl monomer constituent of the subject composition. Such other vinyl monomers suitable for use in the subject composition have been taught by the above patents. If less than about 10 weight percent of N-vinyl-2-pyrrolidone is employed, other vinyl monomers and/or a non-polymerizable solvent are generally included in the composition.

Preferred vinyl monomers taught therein are esters of $C_1$–$C_8$ monohydric alcohols and acrylic or methacrylic acids, preferably acrylic acids, e.g., methyl methacrylate, ethyl acrylate, butyl acrylate, butyl methacrylate, octyl acrylate, 2-ethylhexyl acrylate, etc. Alcohols of higher carbon numbers, e.g., $C_9$–$C_{15}$ as well as difunctional alcohols can also be used to prepare esters or diesters. Vinyl hydrocarbon monomers, e.g., styrene and alkylated styrenes such as vinyl toluene, alpha methyl styrene, etc., may also be used separately or in combination with the aforementioned vinyl monomers. In combination with the acrylate monomers and/or vinyl hydrocarbon monomers, there may be used minor amounts of other vinyl monomers such as nitriles, e.g., acrylonitrile, acrylamide or n-methylol carboxylates, e.g., vinyl acetate. Such vinyl monomers are useful in combination with each of the alpha-beta olefinically unsaturated resins discussed previously and taught by the various patents.

Other vinyl containing compounds which may be employed in combination with the alpha-beta olefinically unsaturated resins are divinyl monomers, trivinyl monomers, tetravinyl monomers, and mixtures thereof. These di-, tri- and tetravinyl compounds are preferably acrylates, methacrylates or vinyl hydrocarbons. The most preferred are esters of acrylic or methacrylic acids and polyhydric $C_2$–$C_8$ alcohols, e.g., neopentylglycol dimethacrylate, 1,6 hexanediol diacrylate, 1,3 butylene dimethacrylate, trimethylolpropane triacrylate, pentaerythritol triacrylate, pentaerythritol tetraacrylate, etc.

Other vinyl containing compounds which are polymerizable with the above discussed organic resins upon introduction of ionizing radiation, are divinyl and tetravinyl compounds such as those disclosed by U.S. Pat. Nos. 3,586,527; 3,586,528; and 3,586,530. These compounds are formed by first reacting a diepoxide or monoepoxide with acrylic acid and/or methacrylic acid and then subsequently reacting the resultant ester condensation product with a saturated acylhalide. The divinyl and tetravinyl compounds disclosed in these patents are homopolymerizable and copolymerizable with each other and with various monovinyl monomers mentioned above.

Still other compounds polymerizable with the alpha-beta olefinically unsaturated resins may be employed as the second binder component. Included in such compounds are the alpha-beta unsaturated siloxanes taught in U.S. Pat. Nos. 3,577,262; 3,577,263 as well as the alpha-beta unsaturated diurethanes of U.S. Pat. No. 3,585,065 formed by reacting an unsaturated diisocyanate with an unsaturated polyester.

In the embodiment employed for flexible substrates, wherein a urethane acrylic oligomer is employed as the alpha-beta olefinically unsaturated resin, the vinyl monomers consist of acrylic ester monomers and N-vinyl-2-pyrrolidone. The term "acrylic" as used herein is meant to include acrylic and methacrylic ester monomers, with acrylic monomers being preferred. Additionally, in this embodiment adapted for coating flexible substrates, these acrylic ester monomers are preferably mono "acrylic" ester monomers, i.e., esters of monohydric alcohols and acrylic or methacrylic acid. These include, but are not limited to, for example, alkyl acrylates such as 2-ethylhexyl acrylate, dioxyalkyl acrylates such as ethoxy ethoxyethyl acrylate, 2-ethoxyethyl acrylate and glycidyl acrylate. This composition, particularly adapted for flexible substrates, may include di-, tri-, and tetra acrylates, for example, neopentylglycol dimethacrylate, 1,6 hexanediol diacrylate, 1,3 butylene dimethacrylate, and trimethylol propane triacrylate. However, when these acrylates are included in the composition they are included in a limited amount, i.e., at least about 70 percent by weight of the acrylic ester monomers are monovinyl functional acrylic esters, more preferably greater than about 80 percent, and most preferably greater than about 90 percent by weight of the acrylic ester monomers are monovinyl acrylic esters.

It should be apparent, that while the urethane-acrylic based coating composition of this invention finds particular use on flexible substrates, it would also be suitable for use on nonflexible substrates.

For coating flexible vinyl fabric, such as those used for example in automobile manufacture, a preferred composition comprises between about 50 and about 70 weight percent oligomer and 50 and about 30 weight percent vinyl monomer, wherein preferably between about 3 and about 10, more preferably between about 3 and about 5 weight percent based on the total weight of oligomer and monomer, is N-vinyl-2-pyrrolidone. Additionally, in such a preferred embodiment greater than about 90 weight percent of the acrylic ester monomers are monovinyl acrylic ester monomers.

OTHER ADDITIVES

The coating compositions of the present invention can also contain other conventional additives, such as flow control and leveling agents, organic and inorganic diluents and pigments, fillers, flattening agents such as polyethylene or silica, plasticizers, lubricants and reinforcing agents such as, for example, aluminum, clay, powder glass, silica, carbon black, graphite fibers or whiskers and fiber glass, (fibers continuous or chopped).

When the paint compositions of the invention are polymerized with ultraviolet radiation, it may be desirable to include a photoinitiator or photosensitizer in the paint. The use of such photoinitiator and examples in various forms which may be employed will be discussed hereinafter in greater detail.

Inert solvents, i.e., solvents that do not enter into the polymerization or crosslinking reactions of the paint binder polymer/monomer system under normal exposure to radiation, can be added to the coating formulation to reduce viscosity and aid in control of application properties. Such solvents are normally selected to be substantially more volatile than the monomeric constitutents of the paint formulation, thus allowing them to evaporate prior to irradiation of the coatings. Suitable solvents include, by way of example and not by way of limitation: toluene, butyl acetate, methylethyl ketone, isopropanol, benzene, tetrahydrofuran, dioxane, methylisobutyl ketone, methylene chloride, chloroform, ethylene chloride, trichloroethylene, trichloroethane, and mixtures thereof.

COATED ARTICLES AND PROCESS FOR MAKING SAME

The selection of the particular unsaturated organic resin will of course depend upon the particular selection of the components polymerized therewith relative to the type of substrate being coated, the intended use of the end product and viscosity of the binder, keeping in mind the desired mode of application.

The radiation polymerizable paints discussed above display unusually good adhesion to a variety of substrates including wood, paper, glass, metal, shaped polymeric surfaces, and particularly polyvinyl chloride surfaces. In addition to these outstanding adhesion properties, the flexible coatings of the invention exhibit excellent physical properties, including discoloration resistance, which are maintained after heat aging even when used as a coating for polyvinyl chloride. Particular application of these coatings includes, for example, use as a coating on vinyl components exposed to high temperature as generated by exposure to sunlight or other environment conditions and as an insulating coating when combined with fillers on electrical wires exposed to high temperature use. The novel paint compositions of the invention, like prior art radiation polymerizable paints discussed above, may be applied to a variety of substrates by conventional means, e.g., brushing, spraying, roller coating, flow coating, etc. to an average thickness which is preferably in the range of from about 0.1 to about 4.0 mils depending on the substrate and intended use of the coated product. The average thickness of coatings on polyvinyl fabric generally is between about 0.2 and about 5 mils.

The novel paint compositions of this invention may be cured or polymerized by exposure to radiation, preferably ionizing radiation or ultraviolet light. In either case the paint compositions may be cured at relatively low temperatures for example between room temperature (20°-25° C.) and the temperature at which significant vaporization of its most volatile component is initiated, ordinarily between about 20° C. and about 70° C. Curing is preferably done under an inert atmosphere of nitrogen (containing less than 1% oxygen).

Conventionally, the film on the substrate is positioned to travel on a conveyor and pass under a source of a free radical generator, such as ultraviolet or electron beam radiation. The coated side of the substrate is exposed to the radiation for a time sufficient to effect polymerization and convert the film into an adherent, tough flexible coating. Polyvinyl chloride fabrics coated with the subject coating composition have been run at line speeds of 600 ft/min, wherein effective cure polymerization was attained by electron beam radiation.

The term "ionizing radiation" as employed herein means radiation haing sufficient energy to remove an electron from a gas atom forming an ion pair, and hence radiation with energy of, or equivalent to or about 5000 electron volts. The preferred method of curing paint films of this invention by exposure to ionizing radiation is by subjecting such films to a beam of polymerization-effecting electrons which is at its source of emission within the range of, or equivalent to, 150,000 to 450,000 electron volts. In this method of curing it is preferred to employ a minimum of 25,000 electron volts per inch of distance between the radiation emitter and the workpiece where the intervening spaces occupied by an inert atmosphere.

Electron beam curing of the coating composition as described above is accomplished at less than 10 Mrads and preferably at between about one half to one Mrads. The abbreviation "Mrads" as employed herein means one million Rads. The term "Rads" means that dose of radiation which results in the absorption of 100 ergs of energy per gram of absorber, e.g., coating film.

Coating compositions containing high levels of pigments, that is up to about 60 percent, generally about up to 40 percent by weight of the composition, can be rapidly and successfully cured using the described electron beam curing technique.

As mentioned above, the radiation polymerizable coating compositions of this invention may also be cured by exposure to ultraviolet light. Preferably, paint compositions according to this invention which are cured by exposure to ultraviolet light contain little (up to 10 percent by weight) or no pigment. Upon exposure to light wavelength of less than about 390, the vinyl monomers employed in the paint compositions of this invention will fragment and produce radicals that can initiate polymerization. However in order to make more efficient use of the high intensity UV sources, and thereby obtain a commercially feasible rate of cure, it is preferred to include a photoinitiator or photosensitizer in compositions to be cured by ultraviolet radiation.

Photoinitiator, are substances, generally organic components, which upon exposure to light of appropriate wavelength give rise to or promote the production of polymerization initiating species. Many different types of free-radical initiators and sensitizers have been studied in acrylic systems and these are well known in the art.

Included among the many suitable photoinitiators are organic carbonyl compounds, peroxides, organic sulfur compounds, other well known initiators such as 2-ethylhexyl-2-cyano 3,3-diphenyl acrylate. Based on availability, solubility in the coating composition of the invention, freedom from color in efficiency of curing at minimum UV levels, the preferred photoinitiators are 2,2-diethoxyacetophenone, benzylphenone and 2-ethylhexyl-2 cyano 3,3-diphenyl acrylate. The amount of each photoinitiator necessary to suitably initiate polymerization of the paint composition of this invention when curing by exposure UV will be apparent to those skilled in the art. It has been found, however that generally the presence of a photoinitiator in the amount of from about 0.5 to about 5.0 parts per 100 parts of the total reactive vehicle solids in the paint composition will produce adequate curing upon exposure to a low pressure ultraviolet lamp.

Dickie et al in U.S. Pat. No. 3,992,477 teach radiation curing which may suitably be used in the subject invention to cure the composition and detail suitable photoinitiators which may be used herein. These teachings of this patent relative to such curing are hereby expressly incorporated by reference.

The preferred coated article of this invention, polyvinyl chloride fabric, is prepared by first coating the vinyl fabric with a highly pigmented bottom coat (soup coat) which is cured by means of electron beam irradiation, optionally applying a middle coat (print coat) which generally requires no curing, and subsequently applying a lightly pigmented or clear top coat (slip coat) which is cured either by ultraviolet light or electron beam irradiation, preferably by electron beam irradiation.

The invention will be further understood by referring to the following detailed examples. It should be understood that these specific example are presented by way of illustration and not by way of limitation. Unless otherwise specified, all reference to "parts" is intended to mean parts by weight.

EXAMPLE 1

An acrylic copolymer is prepared from the following materials:

| | |
|---|---|
| Butyl acrylate | 300 grams |
| Methyl methacrylate | 100 grams |
| Glycidyl methacrylate | 115.6 grams |
| Tertiary butyl peroctoate | 16 grams |
| Toluene | 500 grams |
| Acrylic acid | 57 grams |
| Hydroquinone | 0.4 grams |
| Tetraethyl ammonium bromide | 3.2 grams |

A homogeneous mixture of the butyl acrylate, methyl methacrylate, glycidyl methacrylate, and the tertiary butyl peroctoate are added dropwise over a four hour period to a reaction vessel containing the toluene at a temperature of 110° C. The resulting copolymer solution is allowed to cool to room temperature and a homogeneous mixture of the acrylic acid, hydroquinone, and tetraethyl ammonium bromide is added to the reaction vessel. The temperature is slowly increased to 110° C. (approximately 1 hour) and the mixture is allowed to react for 1–3 hours at this temperature. The copolymer is precipitated out of the solution using hexane and vacuum dried.

A coating composition is prepared in the following manner:

To 10 grams of the acrylic copolymer prepared above is added a monomer solution of 6 grams of diethylene glycol diacrylate, 5 grams of vinyl acetate, and 2 grams of N-vinyl-2-pyrrolidone with gentle agitation so as to not entrap air bubbles until a homogeneous mixture is achieved. A 0.5–1 mil thick film of this composition is applied on a vinyl sheet. The coated vinyl sheet is cured by electron beam radiation as follows:

| | |
|---|---|
| Average Current Density | 275 Kilovolts |
| Current | 30 Milliamps |
| Dose | 1–2 Mrads |
| Atmosphere | nitrogen |

The coated sheet is heat aged for 7 days at 102° C., whereafter the coating displays no color change and maintains is physical properties including excellent adhesion, abrasion resistance and solvent resistance (xylene spot and MEK rubs).

EXAMPLE 2

A coating composition is prepared by combining 10.2 grams of the acrylic resin of Example 1 with a monomer mixture of 3 grams 2-ethylhexyl acrylate, 3 grams vinyl acetate and 2 grams N-vinyl-2-pyrrolidone with gentle stirring until a homogeneous mixture is achieved. This composition is applied to polyvinyl fabric to a thickness of about 0.25 mils by means of a #9 wire wound rod (available from R.D.S. Specialties, New York) and cured by electron beam radiation as in Example 1. After heat aging, the coating showed no color change, and had good physical properties, however fine cracks developed upon flexing of the coated fabric.

EXAMPLE 3

To 80 grams of Hughson Resin 2910-13 (80% urethane-acrylic prepolymer/20% 2-ethylhexyl acrylate by weight; available from Lord Corp.) is added a monomer mixture of 12 grams of ethoxy ethyl acrylate and 8 grams of N-vinyl-2-pyrrolidone. The monomers are added to the resin with gentle agitation so as to not entrap air bubbles. The composition is applied by means of No. 9 wire wound rods to polyvinyl fabric. The coating is cured by electron beam radiation as in Example 1 at a line speed of 400–600 feet/minute to form a flexible, tough, adherent coating which retain its physical properties at elevated temperatures (102° C.) and showed no color change after heat aging for 7 days at 102° C.

EXAMPLE 4

Eighty grams of Hughson Resin 2910-13 is combined with a monomer mixture of 17 grams 2-ethylhexyl acrylate and 3 grams N-vinyl-2-pyrrolidone to form a homogeneous mixture as in Example 3. This mixture is applied to polyvinyl fabric using No. 10 wire wound rods. The coating was cured by electron beam radiation as in Example 1 at a line speed of about 50 ft/minute. The resulting coating so obtained displays excellent adhesion, flexibility, no softening or color change after heat aging, and excellent abrasion and solvent resistance (xylene spot and MEK rubs).

EXAMPLE 5

The procedure of Example 3 is repeated with the exception that the coating composition comprises:

| | |
|---|---|
| Hughson Resin 2910-13 | 75 grams |
| Ethoxyethyl acrylate | 17 grams |
| 1,6-hexanediol diacrylate | 3 grams |
| N—vinyl-2-pyrrolidone | 5 grams |

The coating composition so obtained displays excellent adhesion to a variety of substrates including aluminum, glass, wood and most flexible polymeric substrates, including polyvinyl fabric. The coating, which was cured by electron beam radiation as in Example 1, at a line speed of 50 ft/minute, displays excellent adhesion to the polyvinyl fabric and does not soften or change color after heat aging for 7 days at 102° C. Abrasion resistance and solvent resistance are also maintained.

EXAMPLE 6

The procedure of Example 3 is repeated with the exception that 80 grams of RD-3422-30 Hughson Resin (80% urethane-acrylic prepolymer/20% 2-ethylhexyl acrylate by weight; available from Lord Corp.) are substituted for the equivalent amount of Hughson Resin 2910-13.

The coating is applied to polyvinyl fabric and cured by electron beam radiation as in Example 1 at a line speed of about 400 ft/minute. The cured coating displays excellent physical properties and retention of these properties after heat aging for 7 days at 102° C.

EXAMPLE 7

A coating composition is formed from the following:

| | |
|---|---|
| Hughson Resin 2910-13 | 100 grams |
| Ethoxy ethyl acrylate | 15 grams |
| N—vinyl-2-pyrrolidone | 10 grams |
| pthalo-green millbase (10J304)* | 6.4 grams |

| | |
|---|---|
| 2,2-diethoxyacetophenone | 2 grams |

*conventional millbase available from Ford Vinyl Plant, Mt. Clemens

The pigment is dispersed (using a ball mill) into the resin monomer mixture (cooling may be required to prevent the temperature of the mixture from rising). The composition is applied to polyvinyl fabric and cured by exposure to ultraviolet light (300 watts/inch, 2 lamps) at a line speed of 80 ft/minute. The resulting film adheres well and has flexibility, abrasion resistance and solvent resistance comparable to those cured by electron beam, the coating does not color change after heat treating for 7 days at 102° C.

EXAMPLE 8

The procedure of Example 7 is followed, except that the following coating composition is used:

| | |
|---|---|
| Hughson Resin 2910-13 | 30 grams |
| TiO₂ pigment (Dupont R-902) | 40 grams |
| Ethoxyethyl acrylate | 24 grams |
| N—vinyl-2-pyrrolidone | 4 grams |

The composition is applied to polyvinyl fabric as a soup coat (bottom coat) and cured by electron beam irradiation as in Example 1 at a line speed of about 400 ft/min.

A slip coat (top coat) coating composition is formulated from:

| | |
|---|---|
| Hughson Resin 2910-13 | 72.8 grams |
| 2-ethoxyethyl acrylate | 10.9 grams |
| N—vinyl-2-pyrrolidone | 7.3 grams |
| Verba-Fine A616* | 9.0 grams |

*10 micron polyethylene of molecular weight of 1600 available from Durachem, a division of DURA Commodities Corporation.

The top coat composition is prepared by adding the monomers to the resin with gentle mixing to form homogeneous mixture and thereafter incorporating the Verba-Fine. This top coat composition is applied to the soup coated vinyl fabric and cured by electron beam radiation as in Example 1 at a line speed of 400–600 ft/minute. The coatings show excellent adhesion to each other as well as to the fabric substrate, flexibility, abrasion resistance and solvent resistance (xylene spot and MEK rubs) After heat aging at 102° C. for 7 days the coatings have retained their physical properties and show no color change.

EXAMPLE 9

A clear coat composition is formulated from the following:

| | |
|---|---|
| Hughson RD3422-30 Prepolymer | 64 grams |
| Ethoxy ethyl acrylate | 20 grams |
| 2-ethylhexyl acrylate | 11 grams |
| N—vinyl-2-pyrrolidone | 5 grams |
| *Silica (Syloid 234) | 3 grams |
| 2,2-diethoxyacetophenone | 2 grams |

*Available from W. R. Grace & Co.

After the monomers have been incorporated into the resin to form a homogeneous mixture the silica is added. This homogeneous composition is applied to polyvinyl fabric using No. 16 wire wound rods and cured by ultraviolet radiation as in Example 7. The cured coating possesses excellent adhesion, flexibility, abrasion resistance and solvent resistance and shows no color change after heat aging at 102° C. for 7 days.

INDUSTRIAL APPLICABILITY

It will be obvious from the foregoing that this invention has industrial applicability for substrates needing a decorative or protective coating and provides a flexible, rapid curing, adhesive discoloration resistant coating being particularly suitable for use on polyvinyl chloride substrates, especially polyvinyl chloride fabric which are exposed to high temperature condition during use.

We claim:

1. A coating composition polymerizable by low dosage ionizing radiation, which comprises an organic resin/monomer mixture of:
   (A) between about 97 and about 3 weight percent alpha-beta olefinically unsaturated organic resin containing between about 0.5 and about 5 vinyl unsaturation units per 1000 units molecular weight of said resin, and
   (B) between about 3 and about 97 weight percent vinyl monomers polymerizable with said resin upon exposure to radiation.
   characterized in that said vinyl monomers include N-vinyl-2-pyrrolidone in an amount of from about 3 up to about 10 weight percent based on the total weight of (A) and (B) and that said coating composition is resistant to discoloration in an acid environment.

2. A coating composition according to claim 1, wherein said resin contains between about 0.5 and about 3 vinyl unsaturation units per 1000 units molecular weight of said resin.

3. A coating composition according to claim 1, wherein said resin comprises a urethane acrylic oligomer having the formula

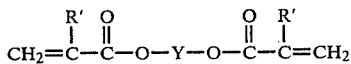

wherein R' is hydrogen or methyl and Y is a divalent urethane residue.

4. A coating composition according to claim 1 or 3, wherein said N-vinyl-2-pyrrolidone is included in an amount of between about 3 and about 5 weight percent based on the total weight of (A) and (B).

5. A coating composition according to claim 3, wherein said vinyl monomers other than said N-vinyl-2-pyrrolidone consist essentially of acrylic ester monomers.

6. A coating composition according to claim 3 or 5, wherein said R' of said oligomer is hydrogen.

7. A coating composition according to claim 3, wherein said oligomer has a molecular weight between about 400 and about 10,000.

8. A coating composition according to claim 5, wherein said acrylic ester monomers comprise at least 70 weight percent of monovinyl acrylic ester monomers.

9. A coating composition according to claim 8, wherein said acrylic ester monomers comprise greater than 80 weight percent of monovinyl acrylic ester monomers.

10. A coating composition according to claim 8, wherein said monovinyl acrylic ester monomers are selected from the group consisting essentially of ethoxyethyl acrylate, 2-ethylhexyl acrylate, isobornyl acrylate, ethoxyethoxyethyl acrylate, glycidyl acrylate and mixtures thereof.

11. A coating composition according to claim 8 or 10, wherein said acrylic ester monomer, other than said monovinyl acrylic ester monomer, is selected from the group consisting of 1,6-hexanediol diacrylate, tetraethylene glycol diacrylate, trimethylol propane triacrylate and mixtures thereof.

12. A 100% solids coating composition polymerizable by low dosage ionizing radiation adapted to coat flexible substrates, which exclusive of pigments, initiators and other non-reactive components, consists essentially of an oligomer/monomer mixture of:
   (A) between about 90 and about 10 weight percent oligomer having the formula

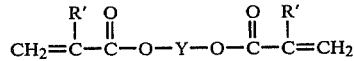

wherein R' is hydrogen or methyl, Y is a divalent urethane residue and said oligomer has between about 0.5 and about 5 vinyl unsaturation units per 1000 units molecular weight of said oligomer; and
   (B) between about 10 and about 90 weight percent vinyl monomers polymerizable with said oligomer upon exposure to radiation. characterized in that said vinyl monomers consist essentially of (i) acrylic ester monomers and (ii) N-vinyl-2-pyrrolidone, wherein said N-vinyl-2-pyrrolidone is included in an amount of from about 3 up to about 10 weight percent based on the total weight of (A) and (B) and that said coating composition is resistant to discoloration in an acid environment.

13. A coating composition according to claim 12, wherein said N-vinyl-2-pyrrolidone is included in an amount of between about 3 and about 5 weight percent based on the total weight of (A) and (B).

14. A coating composition according to claim 12, wherein said R' of said oligomer is hydrogen.

15. A coating composition according to claim 12 or 14, wherein said oligomer has a molecular weight of between about 400 and about 5000.

16. A coating composition according to claim 12, wherein said acrylic ester monomers comprise at least 70 weight percent monovinyl acrylic ester monomers.

17. A coating composition according to claim 16, wherein said acrylic ester monomers comprise greater than 80 weight percent monovinyl acrylic ester monomers.

18. A coating composition according to claim 16, wherein said monovinyl acrylic ester monomers are selected from the group consisting essentially of ethoxyethyl acrylate, 2-ethylhexyl acrylate, isobornyl acrylate, ethoxyethoxyethyl acrylate, glycidyl acrylate and mixtures thereof.

19. A coating composition according to claim 16 or 18, wherein said acrylic ester monomers, other than said monovinyl acrylic ester monomers, are selected from the group consisting of 1,6-hexanediol diacrylate, tetraethylene glycol diacrylate, trimethylolpropane triacrylate and mixtures thereof.

* * * * *